United States Patent [19]

Harstead et al.

[11] Patent Number: 4,643,521
[45] Date of Patent: Feb. 17, 1987

[54] PLURAL-CHANNEL OPTICAL ROTARY JOINT

[75] Inventors: Edward E. Harstead, Park Ridge; Leon Klafter, Whippany; Yan-Chi Shi, Parsippany, all of N.J.

[73] Assignees: AT&T Company; AT&T Bell Laboratories, both of Murray Hill, N.J.

[21] Appl. No.: 628,033

[22] Filed: Jul. 5, 1984

[51] Int. Cl.[4] ............................................. G02B 6/36
[52] U.S. Cl. ............................ 350/96.20; 350/96.10; 350/96.15
[58] Field of Search ............... 350/96.15, 96.18, 96.20

[56] References Cited

U.S. PATENT DOCUMENTS

| 3,829,195 | 8/1974 | Rawson | 350/96.18 |
|---|---|---|---|
| 4,027,945 | 6/1977 | Iverson | 350/96.22 |
| 4,165,913 | 8/1979 | Fitch | 350/96.15 |
| 4,220,411 | 9/1980 | Cowen | 350/96.18 X |
| 4,239,330 | 12/1980 | Ashkin et al. | 350/96.18 |
| 4,268,112 | 5/1981 | Peterson | 350/96.18 |
| 4,378,144 | 3/1983 | Duck et al. | 350/96.18 |
| 4,401,360 | 8/1983 | Streckmann et al. | 350/96.15 |
| 4,401,365 | 8/1983 | Mizokawa et al. | 350/96.20 |

FOREIGN PATENT DOCUMENTS

| 0065351 | 11/1982 | European Pat. Off. | |
|---|---|---|---|
| 0138454 | 10/1979 | Japan | 350/96.18 |
| 56-4103 | 1/1981 | Japan . | |
| 58-105204 | 6/1983 | Japan . | |

OTHER PUBLICATIONS

"Fiber Optic Rotary Joints—A Review", IEEE Transactions on Components, Hybrids, and Manufacturing Technology, vol. CHMT-5, No. 1, Mar. 1982, Glenn F. Dorsey, pp. 37–41.

Primary Examiner—William L. Sikes
Assistant Examiner—Akm E. Ullah
Attorney, Agent, or Firm—Charles S. Phelan

[57] ABSTRACT

An optical rotary joint has a first pair of light beam expanding graded index (GRIN) of refraction lenses coupled to ends of a first pair of lightguide fibers for coupling signals through the rotary joint interface in a first path which is coaxial with the axis of rotation in the interface. A second pair of lightguide fibers are coupled to a second pair of GRIN lenses off-axis and of much smaller diameter than the lenses of the first pair. Prisms couple signals between the off-axis lenses and a second path across the interface and which is also coaxial with the axis of rotation. Also shown is a method for compensating for lens irregularities.

11 Claims, 7 Drawing Figures

PLURAL-CHANNEL OPTICAL ROTARY JOINT

FIELD OF THE INVENTION

This invention relates to optical rotary joints, and it relates more particularly to such devices for coupling plural discrete paths for lightwave signals between relatively rotatable parts of a connector.

BACKGROUND OF THE INVENTION

It has heretofore been difficult to couple signals in discrete optical paths across the interface between relatively rotatable members without suffering relatively high signal losses. Such losses are usually so high that active electronic circuits are required to restore suitable signal levels after coupling through the joint. In a U.S. Pat. No. 4,027,945 to M. L. Iverson, a so-called optical slip ring includes plural bundles of optical fibers coaxially arranged in concentric cylindrical shapes for coupling across an interface between relatively rotatable bodies.

A. H. Fitch shows in U.S. Pat. No. 4,165,913 a multichannel coupler in which signals injected into each of plural optical fibers wrapped around a rotatable shaft at spaced locations are unidirectionally coupled through roughened outer axial surfaces of the fibers to respective stationary, signal detecting heads.

The U.S. Pat. No. 4,401,360 to G. L. Streckmann et al. teaches an optical slip ring arrangement in which multiple, unidirectional electro-optical signal translations are used to couple respective lightguide paths across an interface between relatively rotatable members. Each path so coupled extends between a position off the axis of rotation on one side of the interface and a position on the axis of rotation on the other side of the interface.

SUMMARY OF THE INVENTION

Difficulties of achieving coupling across an interface between relatively rotatable members for multiple lightguide signal paths are reduced by expanding signal paths from discrete optical fibers to have a corresponding number of substantially different path transverse diameters, respectively. Each path, other than the one of largest diameter, is directed into the interface coaxially with the longitudinal axis of that one fiber, which axis is also coaxial with the axis of relative rotation in said interface.

BRIEF DESCRIPTION OF THE DRAWING

A more complete understanding of the invention and its various features, objects, and advantages can be obtained from a consideration of the following Detailed Description in connection with the appended claims and the attached drawings in which:

DETAILED DESCRIPTION

Figure 1:
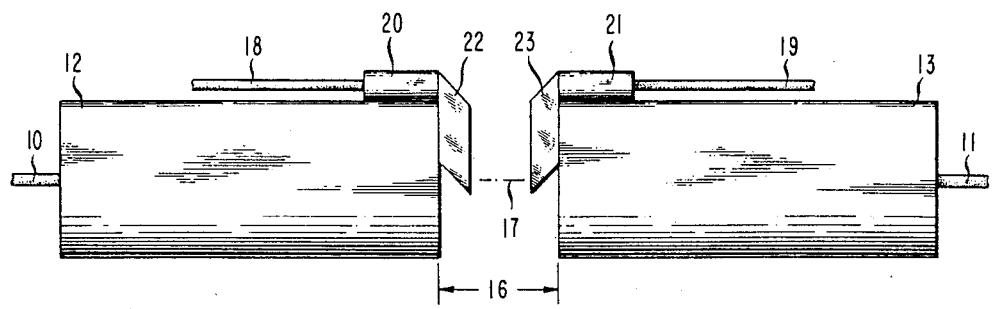
FIG. 1 is a schematic diagram of a plural-channel rotary coupling for lightguide signal paths in accordance with the invention.

FIG. 1 depicts a two-fiber rotary coupler for optical fibers, sometimes called lightguide fibers. A first lightguide signal path includes two fibers 10 and 11 coupled at different ends thereof to an end of each of two graded index (GRIN) of refraction, rod-type lenses 12 and 13, respectively. The lenses expand the transverse diameters of the lightguide paths to be substantially larger than the diameters of the coupled fibers. Opposite ends of those lenses confront opposite sides of an interface region, or space, 16. Lenses 12 and 13 are relatively rotatable with respect to one another about an axis 17 of rotation extending concurrently with the respective longitudinal axes of symmetry of the lenses and across the interface. A second lightguide signal path includes two fibers 18 and 19 coupled at different ends thereof to an end of each of two further GRIN lenses 20 and 21, respectively. Lenses 20 and 21 are fixedly mounted on lenses 12 and 13, i.e. eccentrically located with respect to axis 17, so that opposite ends of lenses 20 and 21 are in a position to confront opposite sides of the interface region 16. End faces of lenses so confronting the interface 16 are parallel to one another and in the same planes with the corresponding end faces of lenses 12 and 13, respectively.

In FIG. 1 the lenses 12 and 13 have transverse diameters, perpendicular to the direction of light signal propagation through the lenses, which are much larger than the similar diameters of lenses 20 and 21, five times larger in one case. Thus, in one application, the lenses 12 and 13 had diameters of about five millimeters (mm) while lenses 20 and 21 had diameters of about one mm. All four lenses are one-quarter pitch GRIN lenses with a parabolic grading of index of refraction. The lenses are commercially available in standard lengths for the respective diameters, and length is not a critical parameter as long as it is sufficient to permit the necessary expanding and/or focusing of the lightguide path.

Figure 2:
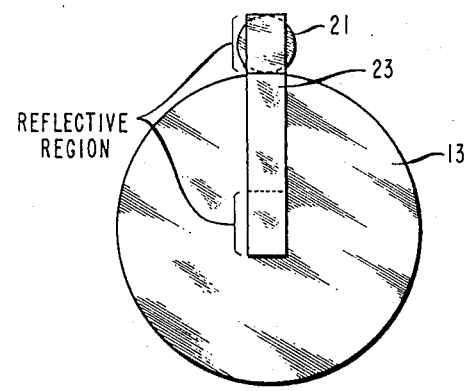
FIG. 2 is an end view of a lens assembly in FIG. 1.

A pair of rhomboid prisms 22 and 23 are secured to confronting end faces of the respective lens sets 12, 20 and 13, 21 to couple light signals between the off-axis lenses 20, 21 and the on-axis portion of the lightguide path across the interface 16 coaxially with respect to the rotational axis 17. Each prism advantageously has an essentially square cross-sectional area in a direction perpendicular to the length thereof between reflecting faces; and it, therefore, has a reflecting face projection on the end of its respective one of the lenses 20 or 21 which covers the maximum cross-sectional area of that lens. In the case of prisms of approximately 0.7 mm square cross section, it can be shown that such prism coverage matches the principal central useful transmission cross section of the lens 20 or 21. This is illustrated in FIG. 2 which is an end view of the assemblage of lens 13 looking in at the left-hand end thereof as illustrated. Since the prism is tranparent to light, except at its angled end reflecting faces, its lower such face is the only part which significantly shadows transmission through lens 13 as shown by cross-hatching in FIG. 2. Although that shadowing involves the lens 13 region of most intense transmission, it can be shown that the insertion loss in the path between lenses 12 and 13 is only about one dB for the illustrative embodiment.

It can be appreciated from the foregoing that the rotary optical coupling technique illustrated in FIG. 1 has some important attributes. One of those attributes is that plural discrete-fiber channels are coupled across the rotational interface. Another is that the coupling is completely passive in the electronic sense and so requires no power supply. Yet another attribute is that the coupling is bidirectional as to each fiber channel; so the user has complete flexibility, initially and from time to time, in deciding how the signal transmission capability of each fiber channel will be exploited. A further attribute is that the availability of single-fiber, vis a vis fiber bundle, transmission paths renders the whole rotary joint more readily miniaturized and more easily manufacturable; and, of course, each of those single-fiber paths can have multiple signal channels multiplexed therein.

Figure 3:
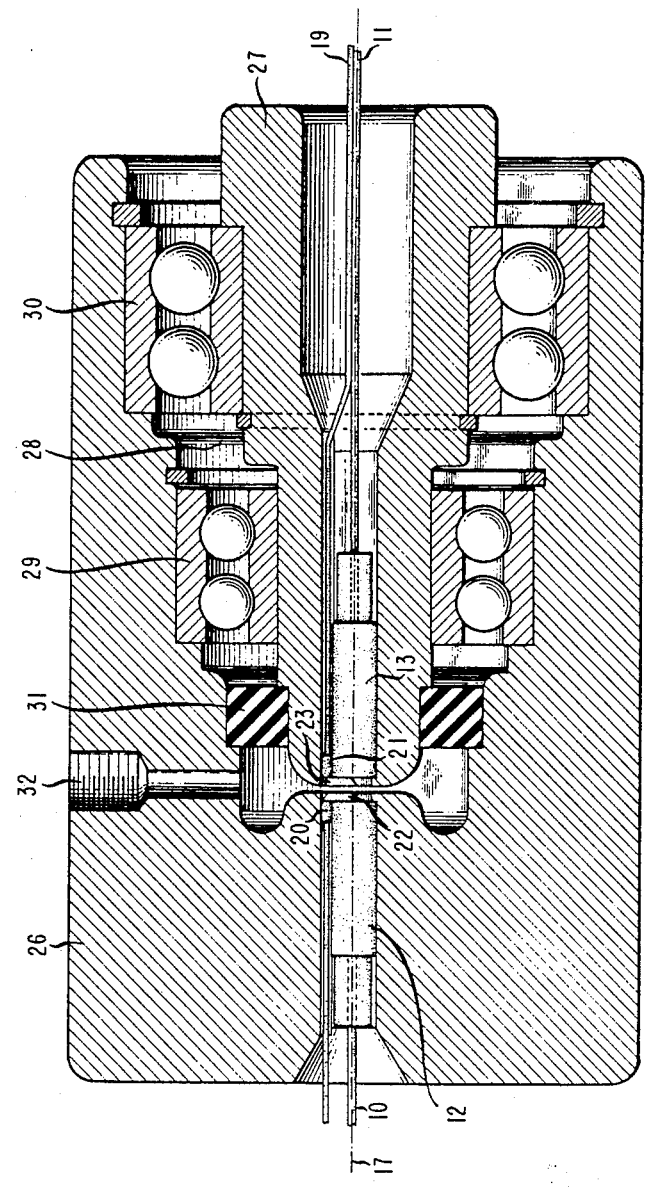
FIG. 3 is a side cross-sectional view of the physical design of a rotary coupling in accordance with FIG. 1.

FIG. 3 illustrates the rotary coupling arrangement of FIG. 1 disposed in relatively rotatable members such as a steel housing 26 and an end portion of a steel shaft 27 which is rotatably received in a shaft-receiving cavity 28 in that housing. Lenses 12, 13 and their respective piggybacked lenses 20, 21 are secured, e.g., by adhesive bonding in precisely machined, central, coaxial apertures in the housing 26 and the shaft 27. Before that part of the assembly, the fibers will have been secured to their respective lenses in a manner known in the art; and cylinders of a suitable material such as glass will have been bonded at each fiber-lens junction to reinforce the bond therebetween. The size of the interface space along the axis 17 is determined by the positioning of double-race ball bearings 29 and 30 of different diameters and constructed to close tolerances to minimize lateral angular motion in a direction perpendicular to the lightguide signal transmission path. The manufacture of housing, shaft, and bearings of sufficient precision for the illustrative rotary coupling is well within the skill of the art. A seal 31 between the housing 26 and shaft 27 retains an interface fluid, such as an index matching fluid, in the interface region 16 between lenses on opposite sides thereof. A port 32 is provided for putting in such fluid.

It sometimes happens that the GRIN lenses which are commercially available are not perfectly true. For example, an end face thereof may not be exactly perpendicular to the central longitudinal axis or the diameter tolerance may be too great.

Figure 4:
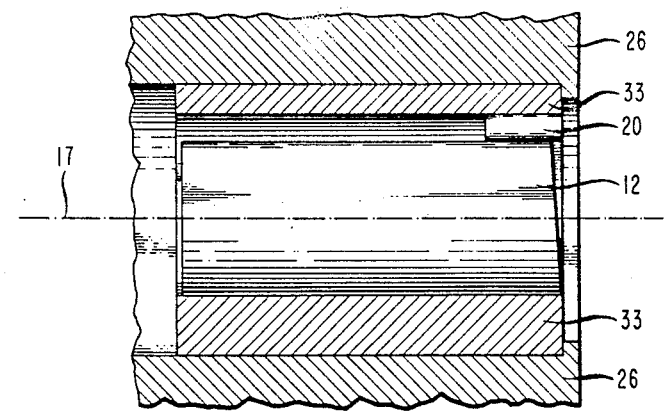
FIG. 4 is a partial diagram of a modified form of the FIG. 3 design.

In such cases, it is advantageous to follow special steps to control the angle and position of bonding of each fiber to one end face of its associated GRIN lens in order to assure that collimated rays exit from the other end face of the lens in a direction which is parallel to the longitudinal axis of the lens. Each pair of lenses is mounted in a cylindrical sleeve 33 prior to being installed in housing 26 as indicated in the partial diagram of FIG. 4 with respect to lenses 12 and 20. One procedure for achieving the mentioned special steps will be outlined in connection with FIGS. 5-7.

Figure 5:
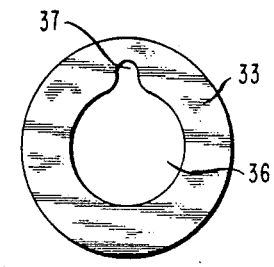
FIGS. 5, 6, and 7 are diagrams illustrating a beam alignment procedure for use in connection with the modification of FIG. 4.
Figure 6:
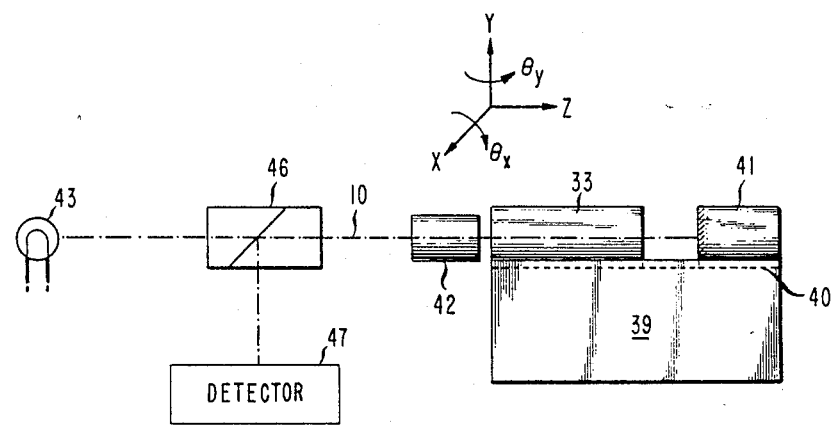

An end view of sleeve 33 is shown in FIG. 5. It is preferably of the same material as is the housing 26, i.e., steel or equivalent. Sleeve 33 has a precisely machined cylindrical outer surface. It also has a similarly drilled coaxial aperture 36 therethrough to accommodate lens 12, and it has a smoothly faired keyway 37 to accommodate lens 20. Lens 12 is installed in hole 36 in sleeve 33 so that it rests immediately opposite keyway 37; and it is bonded in place by, e.g., an epoxy material. The right-hand end of the lens is, in that position, flush with the right-hand end of sleeve 33.

Sleeve 33, with lens 12 installed, is placed in the left-hand end of a vee-groove aligning jig 39. The hidden groove is indicated by a dashed line 40 which represents the bottom apex thereof. A cylindrical mirror 41, with a reflecting face on the left-hand end thereof, is placed in the right-hand end of the same groove. That groove can be of any convenient depth and maximum width which are sufficient to force the longitudinal axes of sleeve 33 and mirror 41 into alignment. An end of the fiber 10 is bonded into a capillary tube 42 which will serve as a brace. The end of fiber 10 is flush with the right-hand end of tube 42. A light source 43 supplies light through a segment of fiber lightguide and a beam splitter 46 to the other end of fiber 10. Light then passes through fiber 10 and lens 12, inside sleeve 33, to be incident upon and reflected by mirror 41 back along the same path to splitter 46. There the reflected light is directed to a detector 47 which indicates intensity of received light energy.

Micropositioners (not shown) are used to move capillary tube 42 and its contained fiber 10 along orthogonal linear X, Y, and Z paths all at least intersecting the central longitudinal axis of sleeve 33 (and contained lens 12) to positions in which maximum reflected energy is indicated by detector 47. The Z axis is, of course, collinear with that longitudinal axis. Tube 42 is then rotated about the Y axis (angle $\theta_y$) and about the X axis (angle $\theta_x$) similarly to obtain maximum detector readings. When all maximum readings have been obtained and rechecked, tube 42 is then bonded to lens 12 with a suitable optical epoxy material to hold the elements in that orientation with respect to one another since that is the position which assures that light emitted from lens 12 will be in rays parallel to the outer surface of sleeve 33, and similarly, such collimated light entering the lens from the opposite direction will be properly focused onto the end of fiber 10.

Next, prism 22 is mounted onto the end face of lens 12 so that the center of its lower (as illustrated) reflecting face lies on the longitudinal axis of sleeve 33, and its other reflecting face confronts the end of keyway 37. Fiber 18 is then aligned with and secured to its small lens 20 in the same manner, except without a sleeve, as just outlined for fiber 10 and lens 12. Sleeve 33, with lens 12 and prism 22, is then placed back in the jig 39.

Figure 7:
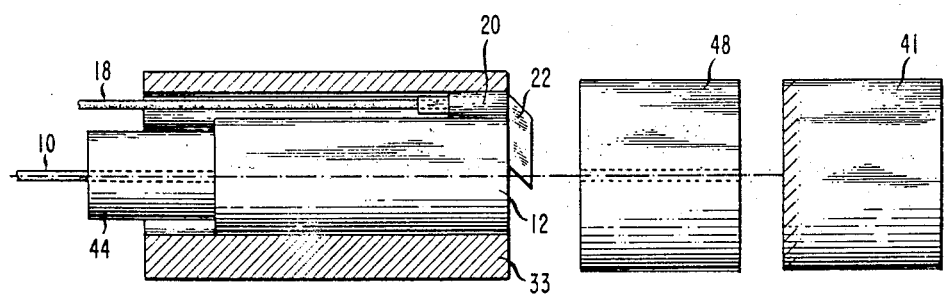

Lens 20 and its connected fiber 18 are now placed into keyway 37 of sleeve 33 so that the end face of the lens touches the side face of prism 22 as shown in FIG. 7. A cylinder 48 with the same outside diameter as the sleeve 33 is placed on the groove of jig 39 between sleeve 33 and the mirror 41. Cylinder 48 has a central longitudinal hole coaxial with its longitudinal axis and having a diameter less than the diameter of the lens 12. In one embodiment the hole diameter is about 0.2 times the lens diameter. Lens 20 is then adjusted in position with respect to its longitudinal axis in the X, Y, and Z linear orthogonal axes and in the angles $\theta_x$ and $\theta_y$, as was done for lens 12. Access for that adjustment is conveniently obtained through a port (not shown) in the top of sleeve 33. As before, the adjustment is complete when maximum intensity reflected energy is detected by detector 47, which is at that time coupled in an arrangement such as that of FIG. 6 to drive fiber 18 from the light source 43. Lens 20 is then bonded in that position. Now it is known that light beams associated with lens 20 and prism 22 are parallel to the outside surface, or longitudinal axis, of sleeve 33 and are, in interface space 16, coaxial with light beams associated with lens 12.

Another alignment procedure is carried out with another cylinder (not shown) to align the fiber 11 on its lens 13, align fiber 19 on its lens 21, install the prism 23, and install the assembly in the central aperture in shaft 27.

Although the present invention has been described in connection with particular embodiments thereof, additional embodiments, applications, and modifications which will be apparent to those skilled in the art are included within the spirit and scope of the invention.

What is claimed is:

1. A rotary coupling for lightguides and comprising
    a first lightguide path including first and second lightguide devices of a first predetermined transverse diameter and relatively rotatable about an axis of rotation, said devices being spaced to define a rotation interface between them, said path extending coaxially with said axis of rotation through said interface,
    a second lightguide path including third and fourth lightguide devices of a second and smaller predetermined transverse diameter and laterally displaced from said axis of rotation, and
    means for directing a predetermined portion of said second path from its displaced devices to be coaxial with said first path in said interface.

2. The rotary coupling in accordance with claim 1 in which said directing means comprises prismatic light reflecting means.

3. The rotary coupling in accordance with claim 1 in which
    means are provided for mounting said first and second devices so that at least an end portion of each of the lightguide devices is coaxial with said axis of rotation and has an end face confronting an end face of the other of such devices across said interface,
    means are provided for mounting said third and fourth lightguide devices so that an end portion of each such lightguide device is radially displaced from, but parallel to, said axis of rotation at least to a peripheral region of said first and second lightguide devices, respectively, and having an end face at said interface, and
    said directing means comprises light beam reflecting means mounted for directing light in said second path to be coaxial with said axis in said interface.

4. The rotary coupling in accordance with claim 1 in which
    said first and second diameters are so related in size that said directing means shadows so little of the cross section of said first path that transmission therethrough is not unduly impaired.

5. The rotary coupling in accordance with claim 1 in which
    said first and second devices are graded index (GRIN) of refraction lenses each located to have one end thereof confronting said interface coaxially with said axis,
    said first path comprises first and second lightguide fibers each coupled one end to another end of a different one of said first and second device lenses,
    said third and fourth devices are GRIN lenses each located to have one end thereof confronting said interface,
    said second path comprises third and fourth lightguide fibers each coupled at one end to an opposite end of a different one of said third and fourth device lenses, and
    said directing means comprises means for coupling light across said one ends of said first and second device lenses between said third and fourth devices lenses and a path portion coaxial with said first path in said interface.

6. The rotary coupling in accordance with claim 5 in which
    said coupling means comprises first and second prisms extending radially across said one ends, respectively, of said first and second device lenses between said axis and said third and fourth device lenses.

7. A rotary coupling for continuous coupling of plural lightguide paths with respect to a rotatable member and comprising
    plural lightguide paths extending across an interface between a pair of members which are relatively rotatable about a predetermined axis of rotation, each path including
    a lightguide fiber, and
    means for expanding said each path adjacent to said interface to a transverse diameter which is substantially different from the expanded transverse diameter of each other one of said paths, said expanding means for at least one of said paths being eccentrically located with respect to said axis, and
    means for directing said at least one of said paths to be coaxial with respect to said axis across said interface, said directing means of each of said at least one of said paths only partially shading each path of larger diameter.

8. The rotary coupling in accordance with claim 7 in which
    said members are a housing and a shaft insertable into said housing along said axis, and
    first and second double-race bearing means of different diameters are provided for journaling said shaft in said housing to permit relative rotation between said members with only small lateral angular movement during rotation.

9. The rotary coupling in accordance with claim 8 in which
    said housing and said shaft include longitudinal apertures coaxially aligned with said axis of rotation,
    said expanding means comprise a different graded index of refraction lens for each of said paths on at least one side of said interface, and
    means are provided for mounting said lenses for said at least one side in said longitudinal aperture of one of said housing and said shaft.

10. The rotary coupling in accordance with claim 9 in which said mounting means comprises
    a cylindrical sleeve enclosing said lenses for said at least one side, and
    means for coupling said fiber of said each path to said lens of such path in a relative position such that light rays exiting from such lens are parallel to external longitudinal surface elements of said cylindrical sleeve.

11. A method for aligning light beam propagation in a light beam expanding means, said method comprising the steps of
    establishing an axial collinear reference alignment of said expanding means and a light reflecting means,
    directing light rays through a light guide fiber and said expanding means to the reflecting means approximately along a path collinear with a central longitudinal axis of said expanding means, detecting intensity of light reflected back through said expanding means and said fiber, adjusting the relative positions of said fiber and said expanding means to achieve a relative position of maximum reflected light intensity, and securing said fiber and said expanding means in said relative position of maximum reflected light intensity.

* * * * *